(12) United States Patent
Dean (10) Patent No.: US 8,116,772 B2
(45) Date of Patent: Feb. 14, 2012

(54) SYSTEM AND METHOD TO FACILITATE ACQUISITION OF ACCESS POINT BASE STATIONS

(75) Inventor: Richard Finch Dean, Lyons, CO (US)

(73) Assignee: Qualcomm Incorporated, San Diego, CA (US)

( * ) Notice: Subject to any disclaimer, the term of this patent is extended or adjusted under 35 U.S.C. 154(b) by 580 days.

(21) Appl. No.: 12/328,630

(22) Filed: Dec. 4, 2008

(65) Prior Publication Data

US 2010/0144337 A1 Jun. 10, 2010

(51) Int. Cl.
*H04W 88/02* (2009.01)
(52) U.S. Cl. .......................................... 455/436
(58) Field of Classification Search ............... 455/422.1, 455/436–444
See application file for complete search history.

(56) References Cited

U.S. PATENT DOCUMENTS

| | | | |
|---|---|---|---|
| 5,673,259 A * | 9/1997 | Quick, Jr. ...................... 370/342 |
| 2002/0077149 A1 | 6/2002 | Tran et al. | |
| 2004/0096222 A1 | 5/2004 | Cagenius | |
| 2004/0110534 A1 | 6/2004 | Chung et al. | |
| 2006/0206246 A1 * | 9/2006 | Walker ............................ 701/16 |
| 2009/0154426 A1 * | 6/2009 | Perraud et al. ................ 370/332 |

FOREIGN PATENT DOCUMENTS

| EP | 1892970 | 2/2008 |
|---|---|---|
| WO | WO2006092470 | 9/2006 |

OTHER PUBLICATIONS

International Search Report and Written Opinion—International Searching Authority-PCT/US2009/066883 Feb. 3, 2010.

* cited by examiner

*Primary Examiner* — Diane Mizrahi
(74) *Attorney, Agent, or Firm* — Abdollah Katbab (57) ABSTRACT

An indoor base transceiver system (BTS) provides economical coverage by having a network-coupled base station that monitors a plurality of remote transceiver units (RTUs), or RF nodes, communicating by base-band conduits at symbol data rate. The BTS can reduce cost by interconnecting coverage nodes at the bit rate and can reduce cost by interconnecting coverage nodes at the symbol rate. The BTS can implement the modulation/demodulation function in a split fashion, with part of this accomplished in the RF Node and part accomplished in an Aggregator of the base station. System capacity can be retained by using selection combining and by using maximal ratio combining. Multiple carriers can be supported by messaging on the signal link and performing the frequency selection/generation at the remote Node. Deployment can be simplified by allowing coverage overlap of Nodes.

25 Claims, 8 Drawing Sheets

SYSTEM AND METHOD TO FACILITATE ACQUISITION OF ACCESS POINT BASE STATIONS

BACKGROUND

1. Field

The present application relates generally to wireless communications, and more specifically to methods and systems to enable associated user equipment to acquire an access point base station, within a building.

2. Background

Typical radio access cellular networks operate by way of various radio transmission devices, or base stations. These base stations provide wireless access to wireless mobile devices, such as cellular phones, to a core network of a cellular service provider. The base stations along with various data routing and control mechanisms (e.g., base station controllers, core and edge routers, and so on) facilitate remote communication for the mobile devices. As communication service providers expand base station coverage, more land areas can be covered by the radio access network. However, some areas can be difficult to provide reliable radio coverage, for various reasons such as population, high mobile traffic, interference with other transmitters, or materials that absorb base station transmission (e.g., dense, concrete and steel buildings, underground facilities, and the like).

Indoor cellular reception in particular has issues such as high interference, especially in higher floors subject to significant pilot signal noise pollution. Some venues have high capacity for people within a small area (e.g., shopping mall, airport terminal). These high density communication venues thus strain available capacity. It can be difficult to provide seamless integration of indoor cells with outdoor cells, not only managing interference but also in association, neighbor lists and handover procedures.

One solution to provide mobile communication support to areas where radio access is difficult, is a 'personal' base station, or femto Base Station (BS) (also termed, e.g., a home Node B or Femto cell). A BS can be a relatively small range device (compared with standard radio network base stations, such as a Node-B) that facilitates wireless communication over a licensed cellular radio band (as opposed to an unlicensed band, utilized by wireless local area network routers). In an exemplary aspect, the BS can be of any size and attaches to a large BTS to serve a large coverage area and amount of user equipment within the coverage area. The BS can maintain a wireless link with cellular devices over such a network band, in a similar manner as a Node-B base station. Consequently, a BS can provide small range cellular coverage for an area that does not receive a good signal from a radio access base station. Often, an individual consumer might utilize a BS in their home, an apartment building, an office building, and so on, for personal cellular access. In addition to mobile phone networks currently in place, a new class of small base stations has emerged, which may be installed in a user's home and provide indoor wireless coverage to mobile units using existing broadband Internet connections. Such personal miniature base stations are generally known as access point base stations, or, alternatively, Home Node B (HNB) or femto cells. Typically, such miniature base stations are connected to the Internet and the mobile operator's network via DSL router or cable modem.

In an attempt to create a more economical solution, typical solutions to achieve uniform radio coverage are to install some sort of distributed antenna system in the building. These can be passive or active (i.e., with electronic gain). These systems are available commercially and consist of cable, fiber, amplifiers, optical equipment and antennas for local in-building coverage. The downside of these systems is that they tend to be quite expensive, labor intensive and difficult to plan and integrate into the external macro cell system. However, in order to provide uniform coverage throughout a facility, the costs can be prohibitive in placing a large number of such RF devices. The RF equipment is cost driven by the fact that the entire radio channel is transported in the cable network. If the system is analog, then expensive analog radio equipment is necessary to implement the system, and the concerns for proper gain and amplitude become expensive design drivers. If the system is digital, then maintenance of proper gain and amplitude can be easier to implement but because the entire radio channel (actually it is typically multiple radio channels) then the digital data rates in the system can become quite large, in the several hundreds of megabit range. This high data rate precludes the use of low cost components are cables.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for communicating over-the-air telephony from within a building. Over-the-air a radio frequency (RF) telephony signal from a communication device is received at a first remote transceiver unit (RTU) of a plurality of RTUs spaced within a structure. A data signal is demodulated from the RF telephony signal and transmitting the data signal and associated data for the first RTU across a data rate communication channel at the bit or symbol rate. The base station receives the data signal and associated data, aggregates the data signal at the base station, and concludes communication by interfacing to a backhaul link to a communication network.

In another aspect, an apparatus is provided for communicating over-the-air telephony from within a building. A means is provided for receiving over the air a radio frequency (RF) telephony signal from a communication device at a first remote transceiver unit (RTU) of a plurality of RTUs spaced within a structure. A means is provided for demodulating a data signal from the RF telephony signal and transmitting the data signal and associated data for the first RTU across a data rate communication channel at the bit or symbol rate. A means is provided for receiving the data signal and associated data at the base station. A means is provided for aggregating the data signal at the base station. A means is provided for concluding communication by interfacing to a backhaul link to a communication network.

In an additional aspect, an apparatus is provided for communicating over-the-air telephony from within a building. A plurality of remote transceiver units (RTUs) are spaced within a structure. A first RTU receives over the air a radio frequency (RF) telephony signal from a communication device, and demodulates a data signal from the RF telephony signal and transmitting the data signal and associated data for the first RTU. A data rate communication channel provides communication at the bit or symbol rate. A base station receives the data signal and associated data at the base station, aggregates the data signal at the base station, and concludes communication by interfacing to a backhaul link to a communication network.

In a further aspect, a computer program product is provided for communicating over-the-air telephony from within a building comprising a computer-readable storage medium comprising having a first set of instructions for causing a computer to receive over the air a radio frequency (RF) telephony signal from a communication device at a first remote transceiver unit (RTU) of a plurality of RTUs spaced within a structure. A second set of instructions causes the computer to demodulate a data signal from the RF telephony signal and transmitting the data signal and associated data for the first RTU across a data rate communication channel at the bit or symbol rate. A third set of instructions causes the computer to receive the data signal and associated data at the base station. A fourth set of instructions causes the computer to aggregate the data signal at the base station. A fifth set of instructions causes the computer to conclude communication by interfacing to a backhaul link to a communication network.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents

DETAILED DESCRIPTION

An indoor base transceiver system (BTS) provides economical coverage by having a network-coupled base station that monitors a plurality of remote transceiver units (RTUs), or RF nodes, communicating by base-band conduits at symbol data rate. Thereby, can start a cellular or personal communication service (PCS) or other wireless call session walk into the center of a building while maintaining the session. The BTS can reduce cost by interconnecting coverage nodes at the bit rate and can reduce cost by interconnecting coverage nodes at the symbol or data rate. The BTS can implement the modulation/demodulation function in a split fashion, with part of this accomplished in the RF Node and part accomplished in an Aggregator of the base station. System capacity can be retained by using selection combining and by using maximal ratio combining. Multiple carriers can be supported by messaging on the signal link and performing the frequency selection/generation at the remote Node. Deployment can be simplified by allowing coverage overlap of Nodes.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
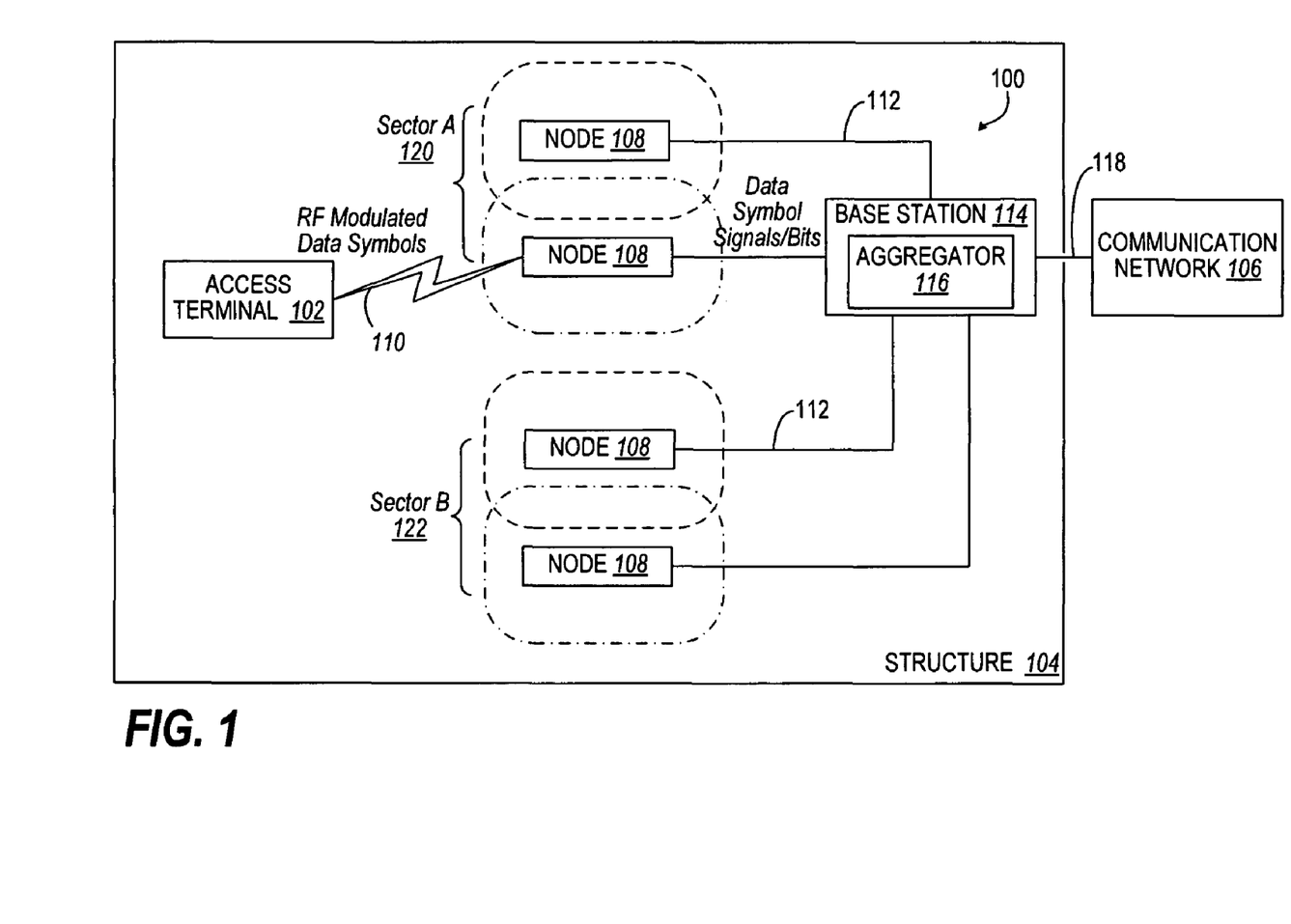
FIG. 1 illustrates an exemplary wireless communication system of a plurality of remote radio frequency (RF) transceiver nodes positioned to communicate over the air with an access terminal with demodulated data signals relayed over a conduit to an aggregator of a base station that has a backhaul link to a communication network.

With reference to FIG. 1, an indoor radio access network (RAN) 100 extends reception of a communication device (access terminal) 102 inside of a structure 104 that would otherwise hamper coverage so that a communication session can be maintained with a broader communication network 106. The indoor RAN 100 provides an apparatus for communicating over-the-air telephony from within a building. A plurality of remote transceiver units (RTUs) (or radio frequency (RF) nodes) 108 are spaced within the structure 104. A first RTU 108 receives over-the-air (OTA) RF telephony signal depicted at 110 from the access terminal 102, demodulates a data signal from the RF telephony signal and transmits the data signal and associated data for the proximate RTU (e.g., demodulation parameters, node identifier, etc.). This first RTU 108 can be the only RTU 108 within coverage range of the access terminal 102 or denote the RTU 108 with the least signal path loss (attenuation). For example, the reception of the first RTU 108 can benefit from proximity, least structural obstructions or less nearby interfering sources as compared to other RTUs 108. A data/symbol rate conduit (e.g., small voltage data signal (SVDS) Ethernet, RS232, optical fiber, etc.) 112 provides communication between each RTU 108 and an indoor base station (BS) 114. The indoor BS 114 station for receiving the data signal in either symbol form or bit form as well as associated data (e.g., node identifier, telephony RF band, received signal strength, etc.).

For the reverse link (RL), the indoor BS 114 has an Aggregator 116 that aggregates the data signal, which can include selecting a first RF node 108 with the greatest signal strength. Alternatively or in addition, the indoor BS 114 can enhance the signal-to-noise by combining the received data signal, such as by synchronizing for propagation delays. The indoor BS 114 concludes telephony communication by interfacing to a backhaul link 118 to the communication network 106.

For the forward link (FL), the BS 114 transmits data signals across the appropriate portions of the data/symbol rate conduit 112. For example, the indoor BS 114 can select one RF node 108 with least path loss. Alternatively or in addition, each RF node 108 within a sector, depicted respectively at 122, 124, or within the entire structure 104, can carry a common forward link. In one aspect, the common FL includes use of a common carrier frequency and a common pseudo noise offset or scrambling code. Differential delays either due to propagation or introduced by the indoor BS 114 can provide diversity to the FL. Such diversity can be achieved with an RF node 108 that has integral diversity capability or by cooperation of two RF nodes 108 with overlapping coverage for a spatial diversity gain. This gain can be realized as a true soft handoff gain between two different coverage nodes (using different PN offsets or different PNs) or as a temporal gain realized by using slightly different time offsets in the 108 nodes and using the RAKE receiver for diversity combining.

Figure 2:
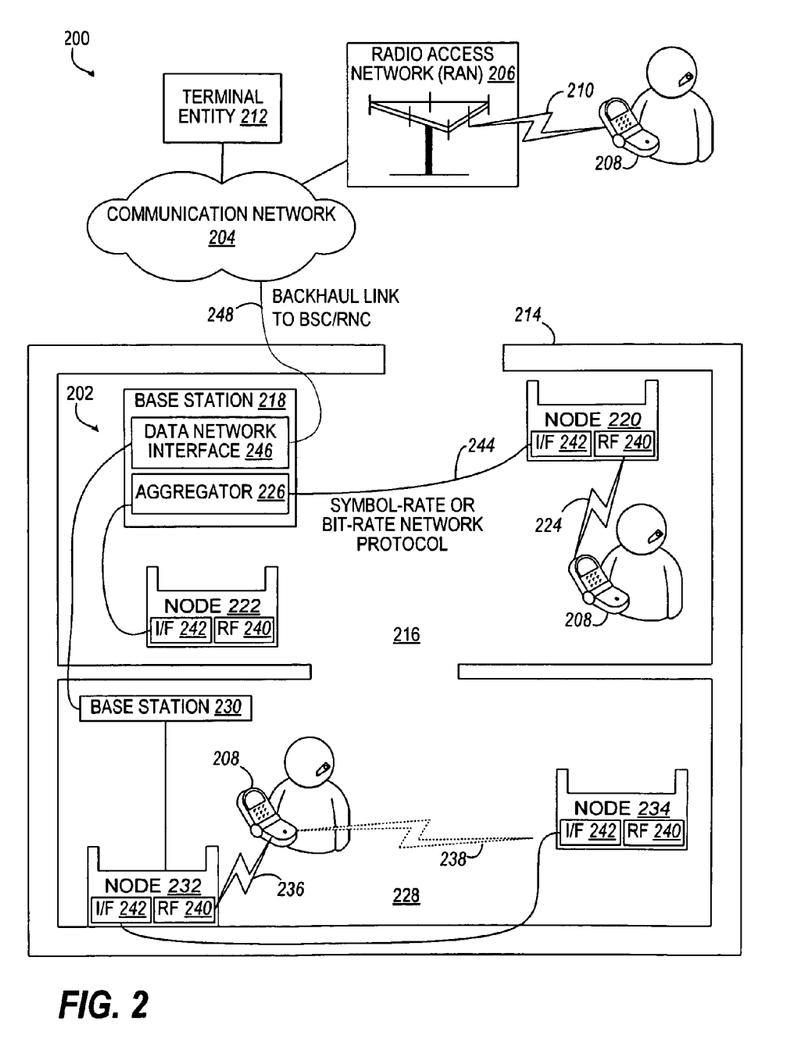
FIG. 2. illustrates an exemplary communication system wherein seamless integration of an outside base transceiver system (BTS) to an indoor BTS (base station with aggregator) is provided for coverage within a facility provided by a plurality of RF nodes (remote transceiver units)

With reference to FIG. 2, in another aspect a communication system 200 comprises an indoor RAN 202 that extends the coverage of a communication network 204 that also includes an outside RAN 206. For example, a mobile device 208 can initiate a telephony session via an OTA link 210 to the outside RAN 206 to a terminal entity 212. The telephony session can be maintained when the mobile device 208 moves within a building 214, initially within a first sector 216 served by a first indoor base station (BS) 218 and a plurality of RF nodes 220, 222 having overlapping coverage area. In this depiction, a single forward link 224 is depicted with an aggregator 226 of the indoor BS 218 performing node selection. The mobile device 208 can move to another sector 228 covered by another indoor BS 230 with a plurality of RF nodes 232, 234. In this instance, the mobile device 208 can be communicating via both nodes 232, 234, albeit with a greater received signal strength of reverse link 236 to node 232 than reverse link 238 with node 234.

Each node 220, 222, 232, 234 can advantageously have an RF component 240 that interacts with the mobile device 208 with identical or similar communication protocols as outside RAN 206, although advantageously the power control can be reduced to provide a coverage area appropriate for portions of a building. Demodulated communication symbols or bits can then be transmitted by a digital interface 242 as low voltage data symbols in baseband over a network data conduit, such as an Ethernet CAT5 cables 244 received at the aggregator 226. A data network interface 246 of each indoor BS 218, 230 is linked by a backhaul 248 to a base station controller system (BSC) or radio network controller (RNC) (not shown) of the communication network 204, or to another BS 230.

In modern digital cellular 2G and 3G systems, the real requirement is to transport information at the bit rate or the symbol rate, which is considerably slower than the rate required to digitize the radio bandwidth. By realizing transporting information at the bit or symbol rate, then the component and cable costs are substantially reduced. Rather than modulating and demodulating at the base stations 218, 230, the RF nodes 220, 222, 232, 234 perform the modulation/demodulation. Advantageously, the indoor RAN 202 can support soft handoff that requires simultaneous transmission of the same data on the forward link from multiple sources (e.g., base stations 206, 218, 230). In a similar fashion, the reverse link performance is enhanced with the simultaneous reception at multiple receivers (e.g., base stations 206, 218, 230). This requirement is met by having a similar capability without reducing system capacity due to unwanted interference. In addition, the indoor RAN 202 is capable of resolving multipath, which can include having multiple receivers (e.g., nodes 232, 234 in sector 228) that can demodulate the symbols in each radio path, so that the symbol energies can be combined to improve the signal-to-noise ratio (SNR) of the received signal. By splitting functions between the base station 218, 230 and RF nodes (remote transceiver units) 220, 222, 232, 234, which can modulate and demodulate the radio signal to the symbol or bit level, the Aggregator 226 of the base station 218 can collect the symbols or bits from multiple nodes 220, 222 and perform combining on the symbols, or selection on the bits, and coordinate in the normal base station structure to realize the normal signaling and soft handoff functions.

Thus, with the node 220, 222, 232, 234 now communicating at the bit or symbol rate, the required data rate between the node 220, 222, 232, 234 and the aggregator 226 is greatly reduced over having to route a high bandwidth RF signal through a building. This allows the use of much less expensive interconnect schemes. For example, one low cost implementation can entail use of CAT5 wire, multimode fiber, and the Ethernet protocol. When the indoor RAN 202 operates at the symbol rate, then the aggregator 226 can perform true soft decision maximal ratio combining and achieve the most spatial gain. In some aspects, this approach can require that the symbol rate is some multiple of the bit rate (i.e., typically 2× to 4×) and these symbols are weighted so as to indicated their signal strength or quality, and that weighting also increases the data rate (usually a few bits per symbol). When the indoor RAN 202 operates at the bit rate, then the aggregator 226 can be limited to performing selection combining, which is less powerful than a true soft handoff but still is a large improvement in the link. Use of a bit rate scheme does minimize the data rate between the node 220, 222, 218, 230 and the aggregator 226.

Conventional cellular systems typically require multiple radio links (e.g., channels, carriers, frequency assignments) to support the required traffic load. These characteristics can complicate an in-building implementation since calls started outside the building could be on any one of multiple carriers. As the phone user transitions into the building 214, the in-building system (indoor RAN 202) can perform a hard handover to carriers that are supported by the indoor RAN 202, which can be a subset of those supported by the outside RAN 206. When the same carrier is supported, a soft handoff can be performed. By including additional signaling between nodes 220, 222, 232, 234 and the inside BS 218, 230, an indication can be made as to what carrier the node 220, 222, 232, 234 should map the symbol/bit stream to. Alternatively, a single carrier can support the inside RAN 202 to reduce the overall bit rate. The requirement to support multiple carriers can be deemed unwarranted given the typical load that a building 214 presents. Outdoor systems (e.g., RAN 206) can have a large coverage footprint, so that they coverage a large number of users and the capacity of the multiple carriers is well matched to the required load. The typical building 214 does not present that same number of users that a large cell would encompass. So the economics of placing cells in the building 214 is typically not compelling. An advantageous solution presented herein is to use multiple nodes 220, 222, 232, 234 in many locations so that the aggregate load is well matched to the capacity of multiple carriers. By reducing the interconnect cost, economical service is achieved. Planning the radio link coverage of the building 214 could otherwise prove to be difficult and tedious. Use of low-cost nodes 220, 222, 232, 234 with low-cost interconnect costs (e.g., CAT5 wire/Ethernet protocol) reduces this setup overhead by being tolerant in performance and costs of coverage overlap. For example, the indoor BS 218, 230 can perform soft handoff or rapid selection combining to achieve the virtual soft handoff. With many nodes 220, 222, 232, 234 representing a common sector 216, 228, deployment can be simplified.

Figure 3:
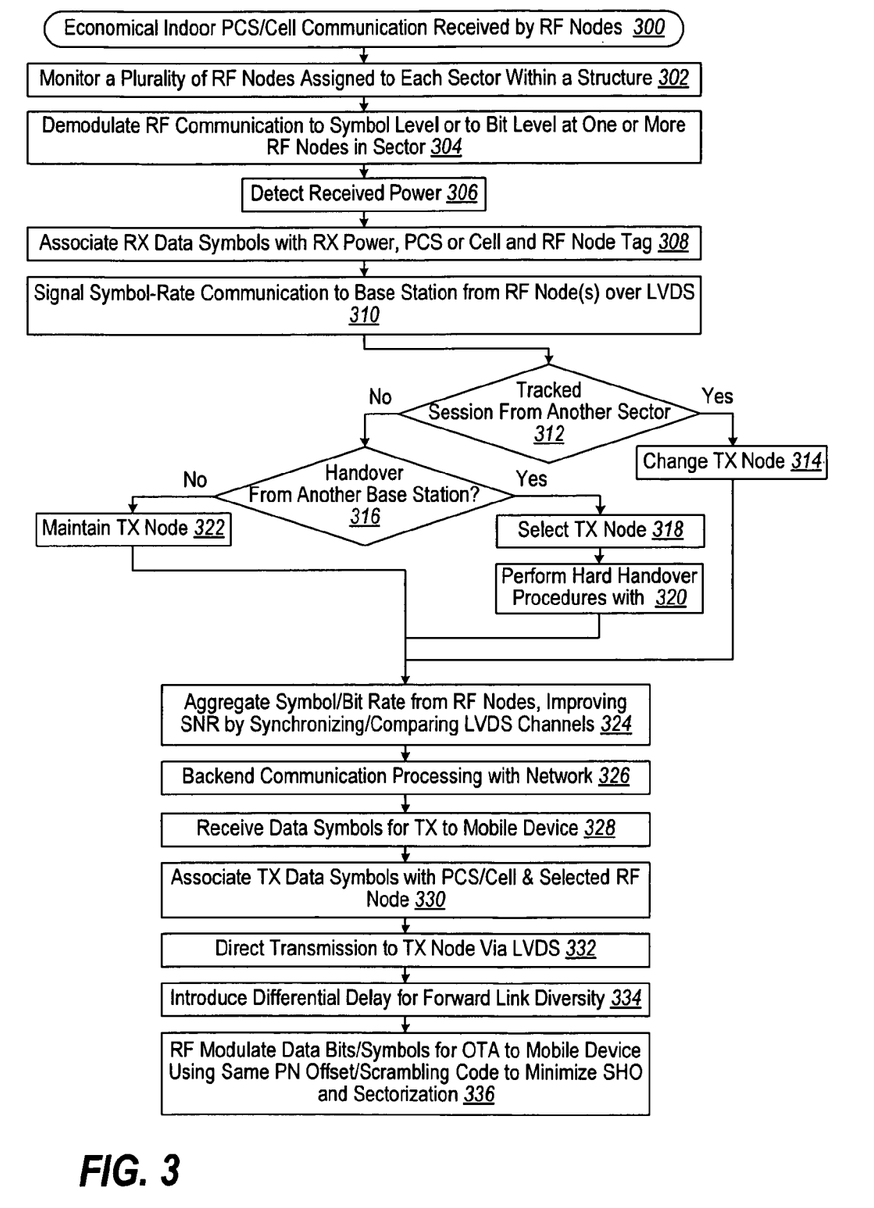
FIG. 3 illustrates a flow diagram of a methodology for economical indoor personal communication service (PCS) or cellular data communication.

FIG. 3 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

In FIG. 3, a methodology 300 is depicted for economical indoor PCS/Cellular communication. An indoor base station monitors a plurality of RF nodes that are spaced with each sector within a structure (block 302). One or more of the RF nodes demodulate a PCS or Cellular OTA signal from a mobile device to detect information at the symbol or bit rate (block 304). The RF node(s) can detect received power (block 306). The RF node(s) can associate other information about the session for maintaining a forward and reverse link with the mobile device (e.g., frequency band) (block 308).

The RF nodes(s) transmit the information at the symbol rate or the data rate along with associated data over a low data rate communication path, such as an illustrative low voltage data signal (LVDS) conduit (block 310).

The base station determines whether the transmitted information pertain to a session currently assigned to another sector (block 312). If so, the transmitting (TX) node that maintains the forward link (FL) is changed to another node (block 314). If not, a further determination is made as to whether a soft or hard handover from another base station is warranted (block 316). If so, then the appropriate TX node is selected for the FL (block 318) and the soft/hard handover procedures are performed (block 320). If not having to change sectors or base stations, then the current TX node is maintained in the neighbor list (block 322).

The base station aggregates the symbol/bit rate signals received from different RF nodes in order to either select the strongest/most accurate information or can further improve SNR by synchronizing and combining what is received on multiple LVDS channels (block 324). The telephony session is maintained by routing the information by backend communication to the network (block 326), which in turn responds with information for the FL (block 328). The associated information about the telephony session (e.g., band, assigned TX node, etc.) is accessed (block 330). The information is routed at symbol or data rate along an appropriate LVDS conduit(s) to the assigned TX node(s) for the FL (block 332). The receiving TX node(s) respond by RF modulating the received symbols/bits for OTA transmission to the mobile device (block 334). This modulation can advantageously use the same pseudo noise (PN) offset, carrier frequency, and/or scrambling code of other RF nodes to minimize the need for soft handovers and sectorization (block 336).

Figure 4:
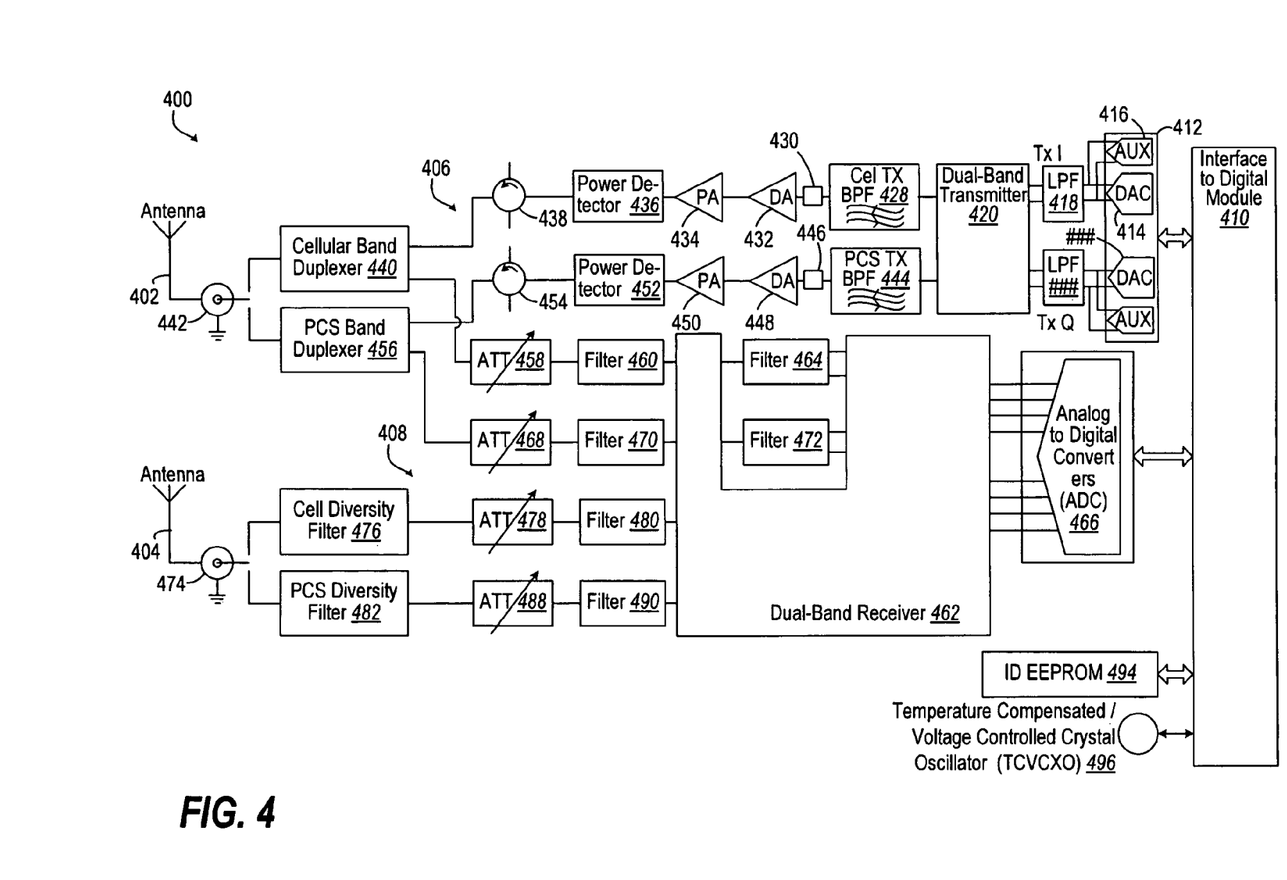
FIG. 4 illustrates a block diagram of an exemplary remote transceiver unit (RTU) of the indoor BTS of FIG. 2.

In FIG. 4, in one aspect a remote transceiver unit (RTU) or RF node 400 can comprise a device having a primary transceiver antenna 402 and a diversity antenna 404. A transmit (TX) portion 406 and a receive (RX) portion 408 can both support PCS band and cellular band communication. A connector interface 410 routes signals between the RF node 400 and a baseband data conduit to a base station (not shown).

In an illustrative implementation for the TX portion 406, a multi-channel digital to analog converters (DAC) device (e.g., AD9746) 412 includes a DAC 414 and Auxiliary DAC 416 that produce differential TX I signals that pass through a low-pass filter (LPF) 418 (e.g., 1 or 2 pole) to a dual-band transmitter 420 (e.g., RFT6150 transmitter by QUALCOMM, San Diego, Calif.). DAC 422 and Auxiliary DAC 424 produce differential TX Q signals that pass through LPF 426 to the dual-band transmitter 420. A Cellular TX output of the dual-band transmitter 420 passes through a cell TX band pass filter (BPF) 428 (e.g., model SAFEF881MAL0F00R00 by MURATA), through a fixed pad cell 430 (e.g., 6 dB), through a differential amplifier (DA) 432 (e.g., model MGA81563 by AVON) through a power amplifier (PA) 434 (e.g., model AWT6273 by ANALDIGICS), through a power detector 436 and isolator 438 (e.g., 0.65 dB for cell) to cellular-band duplexer 440 (e.g., model DFYH9836MHFJBA-TM1 by MURATA) that can be connected by a band selector 442 to the antenna 402. A Similarly, a PCS TX output of the dual-band transmitter 420 passes through a PCS TX BPF 444 (e.g., model FAR-F6EA-1G9600-A2NYQ by FIJITSU), through a fixed pad cell 446 (e.g., 6 dB for PCS), a DA 448, PA 450 (e.g., model AWT6279, ANADIGICS), power detector 452 and isolator 454 (e.g., 0.5 dB) to PCS band duplexer 456 (e.g., model DFYHA1G88HFHAB-TM1, MURATA) that can be connected by the band selector 442 to the antenna 402.

With regard to the RX portion 408, a received signal from antenna 402 passes through cell-band duplexer 440 through a variable attenuator (ATT) 458, a filter 460, to a dual-band receiver 462 (e.g., model RFR6500, QUALCOMM, San Diego, Calif.). This signal path passes through a filter 464. The demodulation performed by the dual-band receiver 462 passes through an analog-to-digital converters (ADC) device 466 to the connector interface 410 to the baseband data conduit to the base station (not shown). The PCS-band duplexer 456 can route a received RF signal to a variable attenuator 468 through a filter 470 to a filter 472 for this signal attached to the dual-band receiver 462. An RF signal received by the diversity antenna 404 that is selected by band selector 474 passes through a cellular diversity filter 476 to a variable attenuator 478 through a filter 480 to the dual-band receiver 462. The band selector 474 can route a PCS RF signal to a PCS diversity filter 482 through a variable attenuator 488 through a filter 490 to the dual-band receiver 462.

An ID code or number is stored in an electrical erasable programmable read only memory (EEPROM) 494 is accessible from the connector interface 410 to identify the source and target of digital signals that pass from the RTU 400. A temperature compensated/voltage controlled crystal oscillator (TCVCXO) 496 is used by the various components of the RTU 400.

Figure 5:
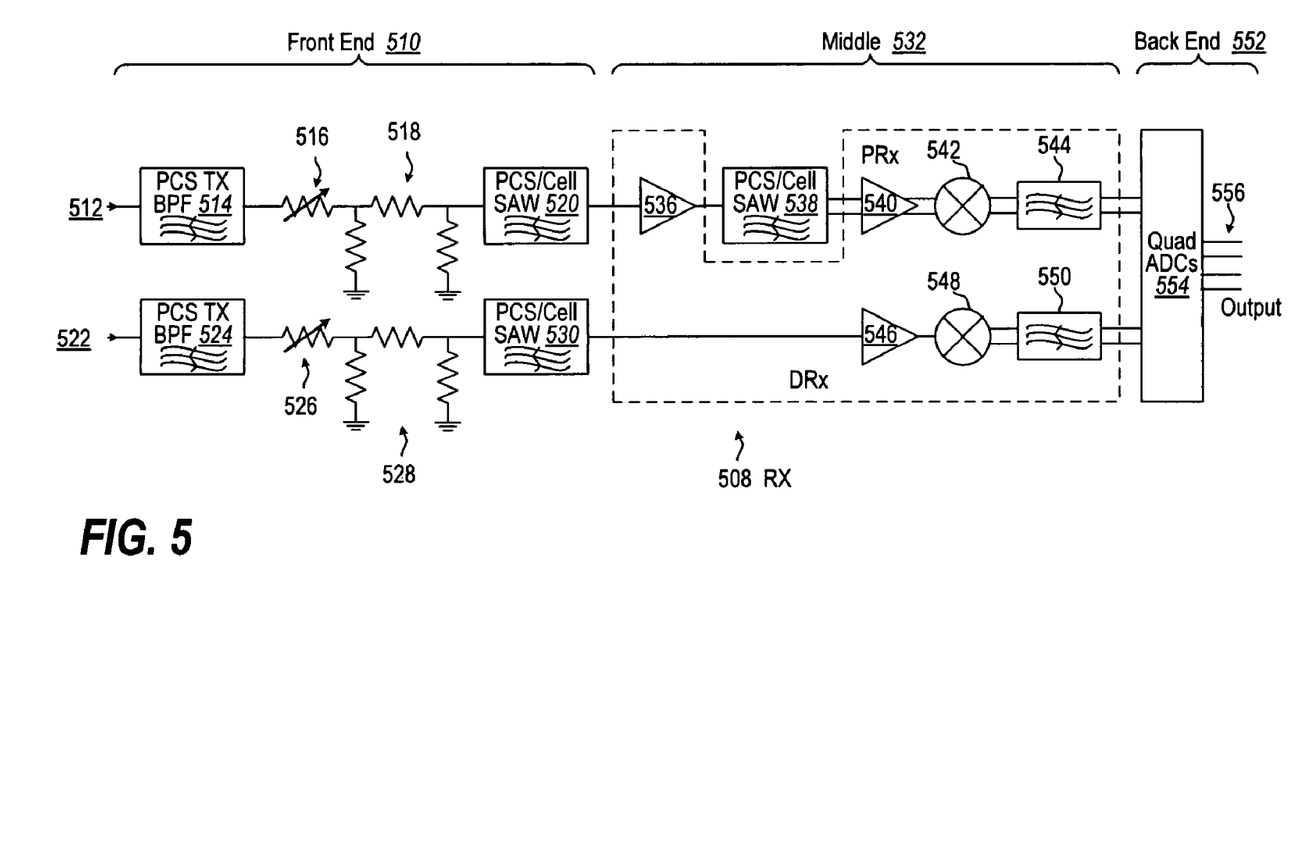
FIG. 5 illustrates a block diagram of one aspect of a receiver portion of the RTU of FIG. 4.

In FIG. 5, a particular aspect of a receiver portion 508 depicts one RF processing for one of the two bands (i.e., PCS, cellular). A front end 510 comprises a primary RF signal (PRx) at 512 from the primary antenna (not shown) that passes through a filter 514 to a variable attenuator 516 (e.g., model HMC288MS8, HITTITE) to a fixed pad 518 (e.g., a series resistor with each terminal grounded via respective resistor), to a Surface Acoustic Wave (SAW) filter 520. A diversity RF signal (DRx) from the diversity antenna (not shown) depicted at 522 passes through a SAW filter 524 through a variable attenuator 526 to a fixed pad 528 through a SAW filter 530.

In a middle portion 532 has a dual-band receiver 534 (e.g., model RFR6500 CD90-V7420-3C, QUALCOMM, San Diego, Calif.). What is received from the SAW filter 520 passes through an amplifier 536 of the receiver 534 then to an added SAW filter 538 that provides a differential output to another amplifier 540 to a demodulation mixer 542 through filter 544. The DRx signal from the SAW filter 530 passes through an amplifier 546 through a demodulation mixer 548 and through a filter 550. Both the demodulated PRx and DRx are then provided to a backend portion 552 including an ADC device 554 to an output 556, which is a sample RF that has been converted to baseband or a low frequency IF (intermediate frequency) that goes to a demodulator for conversion to a low bit or symbol rate signal (not shown in FIG. 5).

Figure 6:
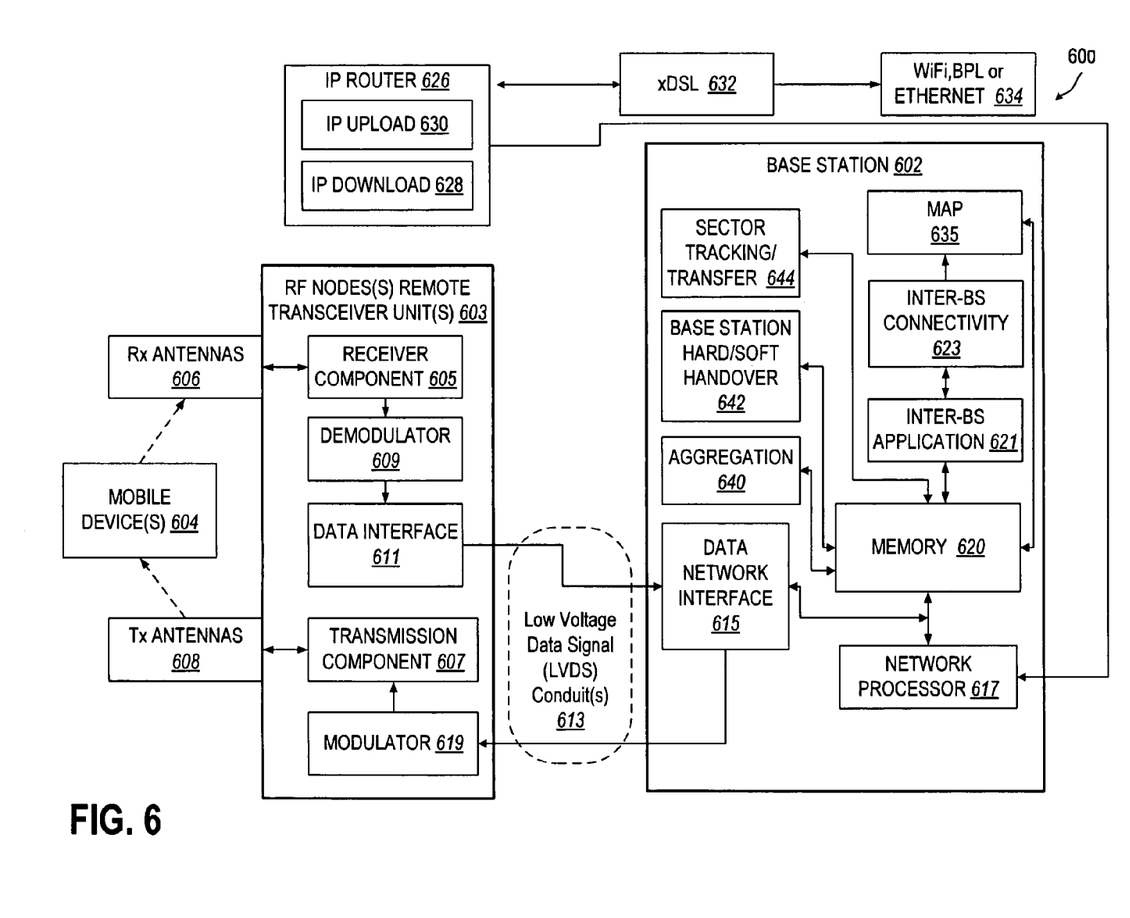
FIG. 6 illustrates a block diagram of a sample indoor Base Station communicating with an access terminal via a plurality of RTUs.

FIG. 6 is an illustration of a system 600 having an indoor base station (BS) or indoor base transceiver system (BTS) 602 that can interface mobile devices 604 with a cellular network (not depicted) by way of indoor network of RF nodes (remote transceiver units (RTUs)) 603 managed by an indoor base station (BS) 602. Each RTU 603 has a receiver component 605 that receives signal(s) from mobile device 604 through a plurality of receive antennas 606. Node 603 also includes a transmission component 607 that transmits to the mobile device(s) 604 through one or more transmit antennas 608. Receiver component 605 can receive information from receive antennas 606. It should be appreciated that receiver component 605 and transmission component 607 can both include WLAN, BPL, Ethernet, UMTS TDD, or WLAN over UMTS TDD spectra communication capabilities in order to interact with mobile devices or with other BS devices.

Receiver component 605 is operatively associated with a demodulator 609 that demodulates received information. Demodulated symbols or bits are tagged with associated data (e.g., received signal strength/power, node identifier, PCS/Cell band, etc.) are transmitted by a data interface 611 at the symbol or data rate across an LVDS conduit 613.

A data network interface 615 of the base station 602 receives the symbol/bit rate from a plurality of LVDS conduits 613 and routed to a network processor 617 that can generate additional signals (e.g., in the form of transmission and/or routing instructions) for the forward link. In particular, the network processor 617 routes at the symbol or data rate a signal via the data network interface 615 for modulation by a modulator 619 and transmitted by transmission component 607. Further, network processor 617 can be coupled to a memory 620. Memory 620 stores information pertinent to effectuating wired and/or wireless communication, depicted as application modules 621, 623 respectively for maintaining a BS network and routing information between BS devices and/or with connected mobile devices, and/or any other suitable information related to performing the various actions and functions set forth herein.

Network processor 617 can route at least a portion of traffic associated with a communication link between BS 602 and a mobile device 604 to a neighboring BS (not depicted) for transfer to a cellular network (e.g., by way of a direct connection to the cellular network, or by way of the Internet) for purposes such as soft or hard handoff.

Furthermore, network processor 617 is configured to direct traffic affiliated with the BS 602 (e.g., generated by a predetermined mobile device or group of mobile devices, for instance) directly to the cellular network by way of an IP router 626 having an IP upload link 628 (e.g., DSL connection, such as ADSL, VDSL, HDSL etc., cable IP connection, BPL connection). In addition, data can be received from the cellular network via an IP download link 630 (e.g., DSL 632, cable, WiFi, BPL, Ethernet 634) and directed to a mobile device 604 affiliated with the BS 602.

Memory 620 can contain application modules that generate instructions for forming, maintaining and/or routing data within a BS network. Specifically, memory 620 can include an inter-BS application module 621 for directing cellular related traffic between the BS 602 and a neighboring BS (not depicted). Additionally, memory 620 can contain an inter-BS connectivity application that maps connectivity between BS 602 and the neighboring BS(s) to compile a connectivity map 635 (e.g., a neighbor list that can be routed to a cellular network RNC for hand-off and multi-hop management). Such a connectivity map 635 can establish contemporaneous propagation, load, Quality of Service (QoS) or availability parameters, or a combination of these or like parameters, associated with BS 602 or the neighboring BS, or both. In addition, varying levels of such parameters associated with both voice or data traffic can be compiled within the connectivity map 635.

In addition to the foregoing, receiver component 605 and transmission component 607 can receive and transmit, respectively, various information to/from a cellular network (e.g., via IP upload 630 and/or IP download 628) or to/from other BS devices of the BS network by way of the IP router 626 that communicates over unlicensed frequencies or wired connections (e.g., WLAN router, LAN router, or the like). For example, receiver component 605 can receive a BS network map 635 from a cellular network RNC (not shown) that indicates inter-BS connectivity parameters for each BS 602 on the BS network. Such parameters can be utilized to coordinate multi-hop routing of cellular traffic from within the BS network. Additionally, instructions for such routing or for managing a soft hand-off with mobile device(s) 604 can be received from the RNC. Additionally, inter-BS connectivity parameters can be received from other BS devices themselves (e.g., because of a broadcast transmission query generated by network processor 617 and transmitted by transmission component 607). In such a case, inter-BS connectivity application 623 can include connectivity parameters associated with other networked BS devices into a connectivity map (described above). The connectivity map 635 can then be utilized by network processor 617 to direct soft hand-off and/or multi-hop routing as described herein.

The memory 620 also executes modules, codes or instructions that manage the plurality of RF nodes 603, depicted as including an aggregation component 640 that selects a symbol rate/bit rate or that synchronizes and combines multiple symbol or data rates. A base station hard/soft handover 642 supports protocols both within the building as well as with external RNC such that the mobile device 604 can perform soft or hard handovers on the RL and FL as performed outside of the building between outside RANs (not shown). A sector tracking/transfer component 646 tracks the received signal strength and assignment of mobile device sessions to enhance FL assignments and to facilitate handovers.

Figure 7:
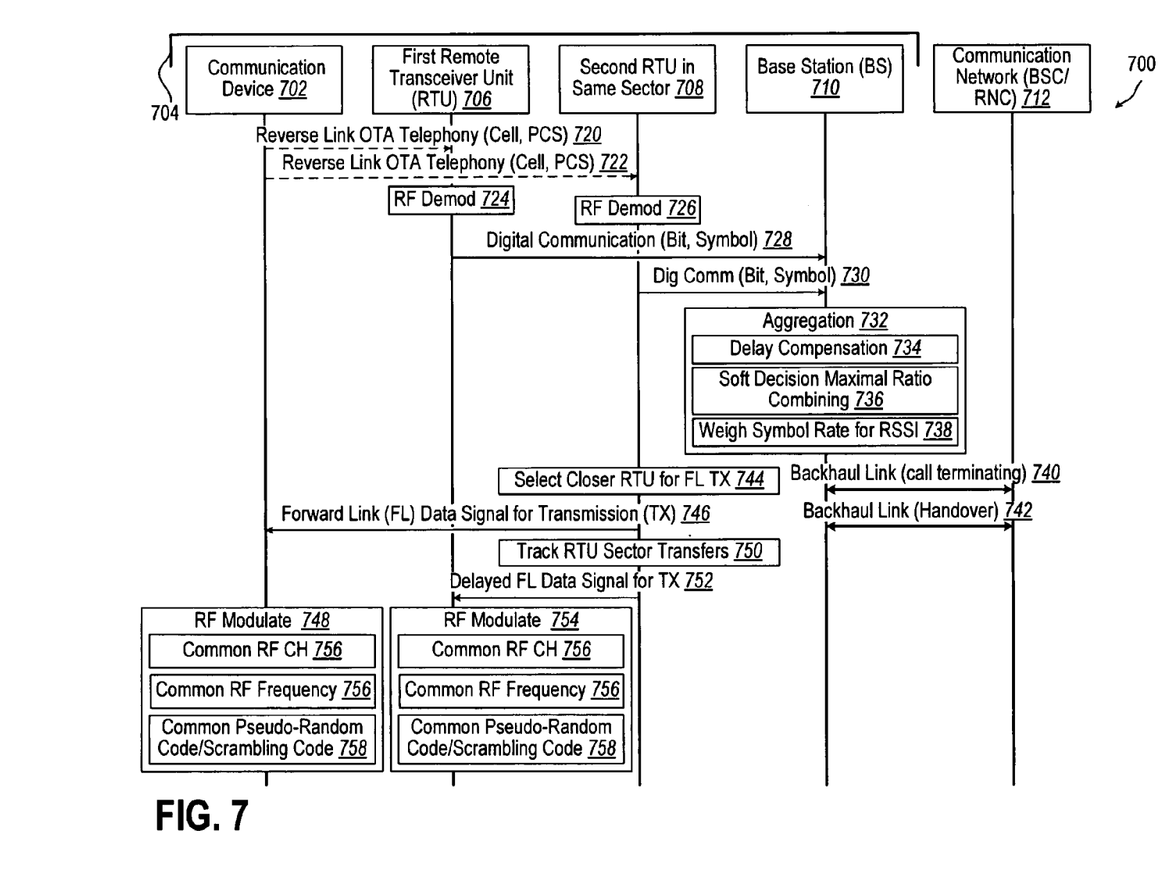
FIG. 7 illustrates a timing diagram of a methodology for communicating over-the-air telephony from within a building.

In FIG. 7, a methodology 700 provides for a communication device 702 communicating over-the-air telephony (e.g., cellular or PCS) from within a building ("structure") 704 via a first remote transceiver unit (RTU) 706 with less path loss and a second RTU 708 within an overlapping sector. The RTUs 704, 706 are of a plurality of spaced RTUs with the structure 704 that communicate at a bit rate or symbol rate over a communication channel to a base station (BS) 710, which can terminate communication sessions outside of the structure 704 to a communication network 712, such as to a base station controller (BSC) or radio network controller (RNC). As depicted at 720, the first RTU 706 for communicating over-the-air (OTA) telephony from within a building can receive over the air a radio frequency (RF) telephony signal from the communication device 702. In some instances as depicted at 722, the second RTU 708 also receives the OTA telephony from the communication device 702, which can illustratively be at reduced received signal strength and with an increased propagation delay. At 724, the first RTU 706 demodulates a data signal from the RF telephony signal. At 726, the other RTU 708 demodulates the data signal from the RF telephony signal. At 728, the proximate RTU 706 transmits the data signal, either at a bit rate or a symbol rate, along with associated data (e.g., band, identifier for RTU 706) for the proximate RTU 706 across a data rate communication channel to the base station 710. At 730, the second RTU 708 transmits the data signal, either at a bit rate or a symbol rate, along with associated data for the other RTU 708 across a data rate communication channel to the base station 710.

As depicted at block 732, the base station aggregates the received data signal to improve signal quality. Such aggregation can comprise compensating for the delay between received data signals (block 734). Such aggregation for a received data signal at a symbol rate that is a multiple of the data signal rate and performing soft decision maximal ratio combining at the base station for increased spatial gain (block 736). Further, the symbol rate can be weighed as an indication of signal strength or quality (e.g., received signal strength indication (RSSI)) in determining how to aggregate and how to transmit back to the communication device 702 (block 738). At 740, the BS 710 terminates the call session as appropriate with the communication network 712. For a new or fading call session, such network communication can comprise facilitating a handover of a telephony session of the communication device 702 with an outside base transceiver station (BTS) via coordination over the backhaul link (block 742). At block 744, the BS 710 selects the first RTU 706 for transmitting data signals back to the communication device 702, which is transmitted from the BS 710 to the first RTU 706 at 746. The proximate RTU 706 RF modulates the forward (downlink) data signal to the communication device 702 as depicted at 748. Advantageously, consider that a previous transmission had been made via the second RTU 708 to the communication device 702 as being closer, the BS 710 can also facilitate a sector transfer tracking (block 750) when deciding to use the now first RTU 706. As depicted at 752, the BS 710 can also introduce a differential delay in forward link transmission for diversity, using the second RTU 708 to module at block 754. As depicted at blocks 756, the RTUs 706, 708 can utilize a common RF channel to the communication device 702 to avoid soft handover requirements. Advantageously, the RTUs 706, 708, can utilize a common RF channel by using a common carrier frequency and either a common pseudo noise offset or common scrambling code (blocks 758).

Figure 8:
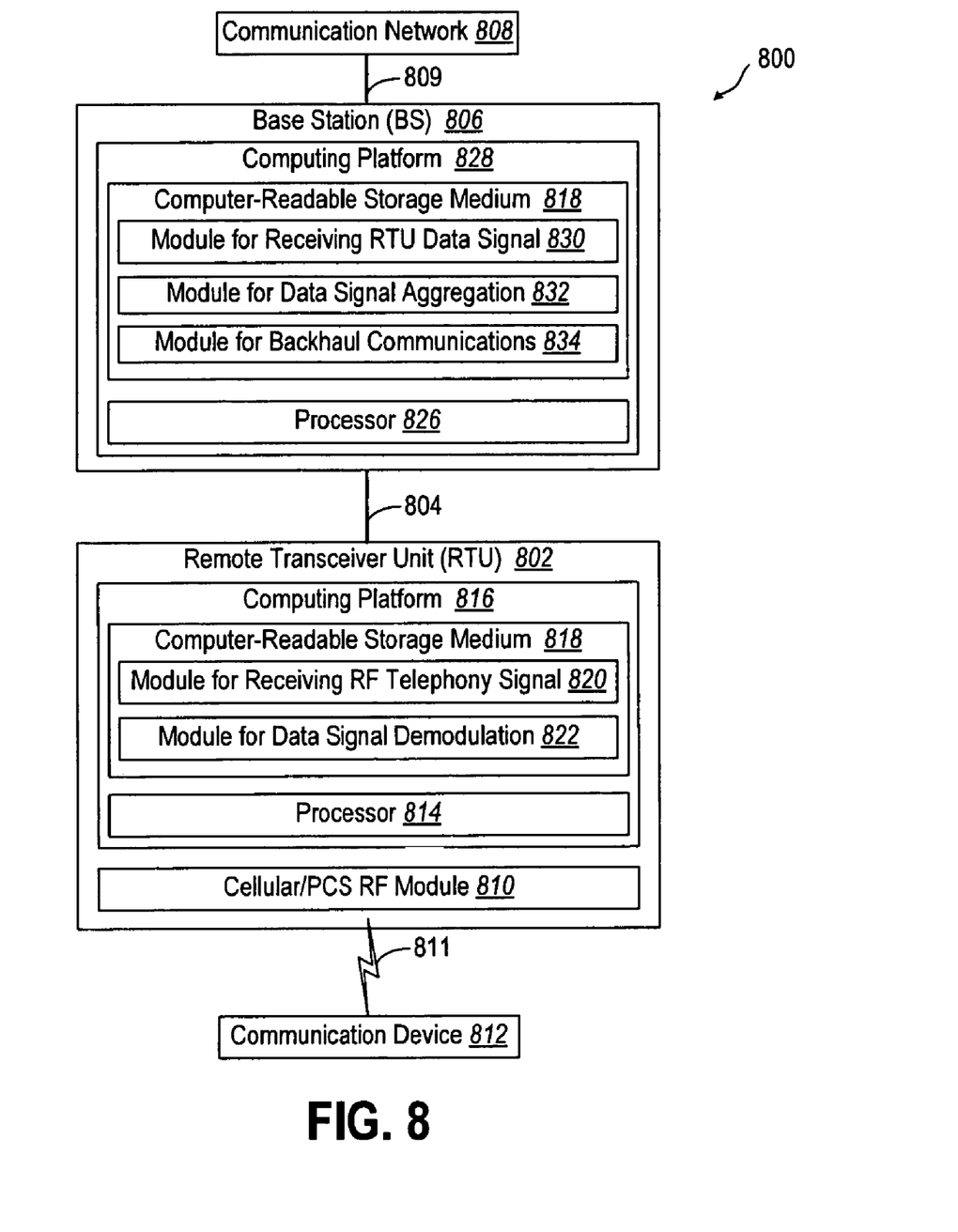
FIG. 8 illustrates a block diagram of a distributed RF receiving and centralized data signal aggregation system for receiving over-the-air telephony within a structure.

In FIG. 8, a distributed RF receiving and centralized data signal aggregation system 800 comprises a remote transceiver unit (RTU) 802 that performs two-way communication via a data communication channel (e.g., small voltage data signal (SVDS) Ethernet, RS232, optical fiber, etc.) 804 with a base station (BS) 806 that interfaces to a communication network 808 via a backhaul link 809.

The RTU 802 has a cellular/PCS RF module 810, which is for communicating via an air link 811 with a communication device 812, is under control of a processor 814 of a computing platform 816. A computer-readable storage medium 818 contains program modules or sets of instructions for causing a computer such as computing platform 816 to perform RF communication and to digitally communicate via the communication channel 804 with the BS 806. In particular, a module 820 is for receiving over the air a radio frequency (RF) telephony signal from a communication device at a first remote transceiver unit (RTU) of a plurality of RTUs spaced within a structure. A module 822 is for demodulating a data signal from the RF telephony signal and transmitting the data signal and associated data for the RTU 802 across a data rate communication channel 804 at the bit or symbol rate.

The BS 806 has a computing platform 824 under control of a processor 826 that execute program module or sets of instructions in a computer-readable storage medium 828 for causing a computer such as the computing platform 824 to perform data communication with the RTU 802 and with the communication network 808. For instance, a module 830 is for receiving the data signal and associated data at the base station 806. A module 832 is for aggregating the data signal at the base station 806. A module 834 is for concluding communication by interfacing to the backhaul link 809 to the communication network 808.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method for communicating over-the-air telephony from within a building, comprising:
   receiving over the air a radio frequency (RF) telephony signal from a communication device at a first remote transceiver unit (RTU) of a plurality of RTUs spaced within a structure;
   demodulating a data signal from the RF telephony signal and transmitting the data signal and associated data for the first RTU across a data rate communication channel at the bit or symbol rate;
   receiving the data signal and associated data at the base station;
   aggregating the data signal at the base station; and
   concluding communication by interfacing to a backhaul link to a communication network.

2. The method of claim 1, further comprising:
   receiving the data signal and associated data from the first RTU and receiving a delayed version of the data signal from another RTU having an overlapping coverage area; and
   aggregating the data signal from both RTUs to improve signal quality.

3. The method of claim 2, further comprising:
   transmitting the data signal to the base station at a symbol rate that is a multiple of data signal rate; and
   performing soft decision maximal ratio combining at the base station for increased spatial gain.

4. The method of claim 3, further comprising weighing the symbol rate as an indication of received signal strength or quality.

5. The method of claim 1, further comprising:
   demodulating a data signal from a selected one of a cellular band and a personal communication service (PCS) band RF telephony signal; and
   transmitting the data signal and associated data that further comprises the selected band.

6. The method of claim 1, further comprising:
   selecting the first RTU for transmitting data signals back to the communication device; and transmitting a data signal from the base station to the first RTU; and
   RF modulating the data signal by the first RTU.

7. The method of claim 6, further comprising the base station facilitating a handover of a telephony session of the communication device with an outside base transceiver station (BTS) via coordination over the backhaul link.

8. The method of claim 6, further comprising selecting the first RTU by the base station to facilitate a sector transfer of a telephony session of the communication device between two sectors within the structure.

9. The method of claim 6, further comprising introducing a differential delay in forward link transmission for diversity.

10. The method of claim 6, further comprising utilizing a common RF channel from a plurality of RTUs to the communication device to avoid soft handover requirements.

11. The method of claim 10, further comprising utilizing a common RF channel by using a common carrier frequency and a selected one of a group consisting of a common pseudo noise offset and scrambling code.

12. An apparatus for communicating over-the-air telephony from within a building, comprising:

means for receiving over the air a radio frequency (RF) telephony signal from a communication device at a first remote transceiver unit (RTU) of a plurality of RTUs spaced within a structure;

means for demodulating a data signal from the RF telephony signal and transmitting the data signal and associated data for the first RTU across a data rate communication channel at the bit or symbol rate;

means for receiving the data signal and associated data at the base station;

means for aggregating the data signal at the base station; and means for concluding communication by interfacing to a backhaul link to a communication network.

13. An apparatus for communicating over-the-air telephony from within a building, comprising:

a plurality of remote transceiver units (RTUs) for spacing within a structure, a first RTU for receiving over the air a radio frequency (RF) telephony signal from a communication device, and for demodulating a data signal from the RF telephony signal and transmitting the data signal and associated data for the first RTU;

a data rate communication channel for communication at the bit or symbol rate; and a base station for receiving the data signal and associated data at the base station, for aggregating the data signal at the base station, and for concluding communication by interfacing to a backhaul link to a communication network.

14. The apparatus of claim 13, further comprising the base station for receiving the data signal and associated data from the first RTU and receiving a delayed version of the data signal from another RTU having an overlapping coverage area, and for aggregating the data signal from both RTUs to improve signal quality.

15. The apparatus of claim 14, further comprising the first RTU for transmitting the data signal to the base station at a symbol rate that is a multiple of data signal rate, and the base station for performing soft decision maximal ratio combining for increased spatial gain.

16. The apparatus of claim 15, further comprising the base station for weighing the symbol rate as an indication of received signal strength or quality.

17. The apparatus of claim 13, further comprising the first RTU for demodulating a data signal from a selected one of a cellular band and a personal communication service (PCS) band RF telephony signal, and for transmitting the data signal and associated data that further comprises the selected band.

18. The apparatus of claim 13, further comprising the base station for selecting the first RTU for transmitting data signals back to the communication device; and transmitting a data signal from the base station to the first RTU, and the first RTU for RF modulating the data signal.

19. The apparatus of claim 18, further comprising the base station facilitating a handover of a telephony session of the communication device with an outside base transceiver station (BTS) via coordination over the backhaul link.

20. The apparatus of claim 18, further comprising selecting the first RTU by the base station to facilitate a sector transfer of a telephony session of the communication device between two sectors within the structure.

21. The apparatus of claim 18, further comprising introducing a differential delay in forward link transmission for diversity.

22. The apparatus of claim 18, further comprising utilizing a common RF channel to the communication device to avoid soft handover requirements.

23. The apparatus of claim 22, further comprising utilizing a common RF channel by using a common carrier frequency and a selected one of a group consisting of a common pseudo noise offset and scrambling code.

24. A computer program product for communicating over-the-air telephony from within a building, comprising:

a computer-readable storage medium comprising, a first set of instructions for causing a computer to receive over the air a radio frequency (RF) telephony signal from a communication device at a first remote transceiver unit (RTU) of a plurality of RTUs spaced within a structure;

a second set of instructions for causing the computer to demodulate a data signal from the RF telephony signal and transmitting the data signal and associated data for the first RTU across a data rate communication channel at the bit or symbol rate;

a third set of instructions for causing the computer to receive the data signal and associated data at the base station;

a fourth set of instructions for causing the computer to aggregate the data signal at the base station; and a fifth set of instructions for causing the computer to conclude communication by interfacing to a backhaul link to a communication network.

25. At least one processor for communicating over-the-air telephony from within a building, comprising:

a first processor module, comprising hardware, for receiving over the air a radio frequency (RF) telephony signal from a communication device at a first remote transceiver unit (RTU) of a plurality of RTUs spaced within a structure;

a second processor module for demodulating a data signal from the RF telephony signal and transmitting the data signal and associated data for the first RTU across a data rate communication channel at the bit or symbol rate;

a third processor module for receiving the data signal and associated data at the base station;

a fourth processor module for aggregating the data signal at the base station; and a fifth processor module for concluding communication by interfacing to a backhaul link to a communication network.

* * * * *